(12) United States Patent
Murrah et al.

(10) Patent No.: US 10,282,480 B2
(45) Date of Patent: *May 7, 2019

(54) MULTIMODE IMAGE AND SPECTRAL READER

(71) Applicant: APDN (B.V.I.) INC., Road Town, Tortola (VG)

(72) Inventors: Judith Murrah, Saint James, NY (US); Phidung H. Tran, East Setauket, NY (US); Maciej B. Szczepanik, Mount Sinai, NY (US); MingHwa Benjamin Liang, East Setauket, NY (US); James A. Hayward, Stony Brook, NY (US)

(73) Assignee: APDN (B.V.I), Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,510

(22) Filed: Jan. 11, 2018

(65) Prior Publication Data

US 2018/0173810 A1 Jun. 21, 2018

Related U.S. Application Data

(63) Continuation of application No. 15/027,454, filed as application No. PCT/US2014/059408 on Oct. 7, 2014, now Pat. No. 9,904,734.

(Continued)

(51) Int. Cl.
*G06K 5/00* (2006.01)
*G06F 17/30* (2006.01)
(Continued)

(52) U.S. Cl.
CPC ..... *G06F 17/30876* (2013.01); *G06K 7/0004* (2013.01); *G06K 19/06037* (2013.01); *G06K 19/0723* (2013.01)

(58) Field of Classification Search
CPC .... G07F 7/1008; G06Q 20/341; G06K 7/084; G06K 7/087; G06K 7/0004; G06K 7/10693; G06K 7/12; G06K 2019/06225
(Continued)

(56) References Cited

U.S. PATENT DOCUMENTS 4,183,989 A 1/1980 Tooth
4,278,557 A 7/1981 Elwell, Jr.
(Continued)

FOREIGN PATENT DOCUMENTS

DE 2518871 A1 11/1975
DE 4443660 C1 10/1995
(Continued)

OTHER PUBLICATIONS

Ullrich, Thomas, et al., "Competitive Reporter Monitored Amplification (CMA)—Quantification of Molecular Targets by Real Time Monitoring of Competitive Reporter Hybridization", Plos One, Apr. 2012, vol. 7, Issue 4.
(Continued)

*Primary Examiner* — Karl D Frech
(74) *Attorney, Agent, or Firm* — Hoffmann & Baron, LLP (57) ABSTRACT

A system associated with authentication of an object related to a multi-mode marker using a processing device. The processing device performs operations that include detecting a signal associated with a multi-mode marker related with the object; assigning a digital code based on the detected signal associated with the multi-mode marker; and identifying the object based on the digital code related to authentication of the object. A corresponding method and computer-readable device are also disclosed.

20 Claims, 4 Drawing Sheets

Related U.S. Application Data (60) Provisional application No. 61/887,797, filed on Oct. 7, 2013.

(51) Int. Cl.
- *G06K 7/00* (2006.01)
- *G06K 19/06* (2006.01)
- *G06K 19/07* (2006.01)

(58) Field of Classification Search
USPC ............... 235/382, 449, 440, 462.13, 462.04
See application file for complete search history.

(56) References Cited

U.S. PATENT DOCUMENTS

| | | |
|---|---|---|
| 4,454,171 A | 6/1984 | Diggle, Jr. et al. |
| 4,548,955 A | 10/1985 | Okahata et al. |
| 4,683,195 A | 7/1987 | Mullis et al. |
| 4,683,202 A | 7/1987 | Mullis |
| 4,739,044 A | 4/1988 | Stabinsky |
| 4,757,141 A | 7/1988 | Fung et al. |
| 4,861,620 A | 8/1989 | Azuma et al. |
| 4,965,188 A | 10/1990 | Mullis et al. |
| 5,047,519 A | 9/1991 | Hobbs, Jr. et al. |
| 5,075,216 A | 12/1991 | Innis et al. |
| 5,089,691 A | 2/1992 | Morisaki et al. |
| 5,132,242 A | 7/1992 | Cheung |
| 5,139,812 A | 8/1992 | Lebacq |
| 5,151,507 A | 9/1992 | Hobbs, Jr. et al. |
| 5,156,765 A | 10/1992 | Smrt et al. |
| 5,176,203 A | 1/1993 | Larzul |
| 5,270,183 A | 12/1993 | Corbett et al. |
| 5,415,839 A | 5/1995 | Zaun et al. |
| 5,429,952 A | 7/1995 | Garner et al. |
| 5,451,505 A | 9/1995 | Dollinger |
| 5,498,283 A | 3/1996 | Botros et al. |
| 5,508,197 A | 4/1996 | Hansen et al. |
| 5,595,871 A | 1/1997 | DelVecchio et al. |
| 5,599,578 A | 2/1997 | Butland |
| 5,602,381 A | 2/1997 | Hoshino et al. |
| 5,639,603 A | 6/1997 | Dower et al. |
| 5,643,728 A | 7/1997 | Slater et al. |
| 5,736,314 A | 4/1998 | Hayes et al. |
| 5,763,176 A | 6/1998 | Slater et al. |
| 5,776,713 A | 7/1998 | Garner et al. |
| 5,849,208 A | 12/1998 | Hayes |
| 5,866,336 A | 2/1999 | Nazarenko et al. |
| 5,912,257 A | 6/1999 | Prasad et al. |
| 5,942,444 A | 8/1999 | Rittenburg et al. |
| 5,956,172 A | 9/1999 | Downing |
| 5,977,436 A | 11/1999 | Thomas et al. |
| 5,989,823 A | 11/1999 | Jayasena et al. |
| 6,013,789 A | 1/2000 | Rampal |
| 6,030,657 A | 2/2000 | Butland et al. |
| 6,033,880 A | 3/2000 | Haff et al. |
| 6,057,370 A | 5/2000 | Weiland et al. |
| 6,127,120 A | 10/2000 | Graham et al. |
| 6,132,996 A | 10/2000 | Hunicke-Smith |
| 6,140,075 A | 10/2000 | Russell et al. |
| 6,169,174 B1 | 1/2001 | Hasegawa et al. |
| 6,261,809 B1 | 7/2001 | Bertling et al. |
| 6,287,768 B1 | 9/2001 | Chenchik et al. |
| 6,312,911 B1 | 11/2001 | Bancroft et al. |
| 6,326,489 B1 | 12/2001 | Church et al. |
| 6,342,359 B1 | 1/2002 | Lee et al. |
| 6,361,944 B1 | 3/2002 | Mirkin et al. |
| 6,379,897 B1 | 4/2002 | Weidenhammer et al. |
| 6,399,397 B1 | 6/2002 | Zarling et al. |
| 6,537,747 B1 | 3/2003 | Mills, Jr. et al. |
| 6,537,752 B1 | 3/2003 | Astle |
| 6,576,422 B1 | 6/2003 | Weinstein et al. |
| 6,608,228 B1 | 8/2003 | Cumpston et al. |
| 6,613,560 B1 | 9/2003 | Tso et al. |
| 6,632,653 B1 | 10/2003 | Astle |
| 6,686,149 B1 | 2/2004 | Sanchis et al. |
| 6,703,228 B1 | 3/2004 | Landers et al. |
| 6,709,692 B2 | 3/2004 | Sudor |
| 6,743,640 B2 | 6/2004 | Whitten et al. |
| 6,995,256 B1 | 2/2006 | Li et al. |
| 7,014,113 B1 | 3/2006 | Powell et al. |
| 7,015,030 B1 | 3/2006 | Fouillet et al. |
| 7,031,927 B1 | 4/2006 | Beck et al. |
| 7,060,874 B2 | 6/2006 | Wilkins |
| 7,112,616 B2 | 9/2006 | Takizawa et al. |
| 7,115,301 B2 | 10/2006 | Sheu et al. |
| 7,133,726 B1 | 11/2006 | Atwood et al. |
| 7,160,996 B1 | 1/2007 | Cook |
| 7,223,906 B2 | 5/2007 | Davis |
| 7,250,195 B1 | 7/2007 | Storey et al. |
| 7,709,250 B2 | 5/2010 | Corbett et al. |
| 7,732,492 B2 | 6/2010 | Makino et al. |
| 8,278,807 B2 | 10/2012 | Agneray et al. |
| 8,597,549 B2 | 12/2013 | Cumpston et al. |
| 9,266,370 B2 | 2/2016 | Jung et al. |
| 9,297,032 B2 | 3/2016 | Jung et al. |
| 9,904,734 B2 * | 2/2018 | Murrah ............... G06K 7/0004 |
| 2001/0039018 A1 | 11/2001 | Matson et al. |
| 2002/0048822 A1 | 4/2002 | Rittenburg et al. |
| 2002/0051969 A1 | 5/2002 | Goto |
| 2002/0056147 A1 | 5/2002 | Dau et al. |
| 2002/0064639 A1 | 5/2002 | Rearick et al. |
| 2002/0080994 A1 | 6/2002 | Lofgren et al. |
| 2002/0119485 A1 | 8/2002 | Morgan |
| 2002/0128234 A1 | 9/2002 | Hubbell et al. |
| 2002/0129251 A1 | 9/2002 | Itakura et al. |
| 2002/0137893 A1 | 9/2002 | Burton et al. |
| 2002/0155490 A1 | 10/2002 | Skinner et al. |
| 2002/0160360 A1 | 10/2002 | Chenchik et al. |
| 2002/0167161 A1 | 11/2002 | Butland |
| 2002/0185634 A1 | 12/2002 | Marder et al. |
| 2002/0187263 A1 | 12/2002 | Sheu et al. |
| 2003/0000225 A1 | 1/2003 | Nagai et al. |
| 2003/0017551 A1 | 1/2003 | Parthasarathy et al. |
| 2003/0031340 A1 | 2/2003 | Alattar et al. |
| 2003/0035917 A1 | 2/2003 | Hyman |
| 2003/0064507 A1 | 4/2003 | Gallagher et al. |
| 2003/0096273 A1 | 5/2003 | Gagna |
| 2003/0142704 A1 | 7/2003 | Lawandy |
| 2003/0142713 A1 | 7/2003 | Lawandy |
| 2003/0162296 A1 | 8/2003 | Lawandy |
| 2003/0177095 A1 | 9/2003 | Zorab et al. |
| 2003/0203387 A1 | 10/2003 | Pelletier |
| 2003/0207331 A1 | 11/2003 | Wilson, Jr. et al. |
| 2004/0063117 A1 | 4/2004 | Rancien et al. |
| 2004/0071718 A1 | 4/2004 | Tsai |
| 2004/0115796 A1 | 6/2004 | Burns |
| 2004/0166520 A1 | 8/2004 | Connolly |
| 2004/0219287 A1 | 11/2004 | Regan et al. |
| 2005/0008762 A1 | 1/2005 | Sheu et al. |
| 2005/0031120 A1 | 2/2005 | Samid |
| 2005/0045063 A1 | 3/2005 | Niggemann et al. |
| 2005/0053968 A1 | 3/2005 | Bharadwaj et al. |
| 2005/0059029 A1 | 3/2005 | Mariella, Jr. et al. |
| 2005/0059059 A1 | 3/2005 | Liang |
| 2005/0112610 A1 | 5/2005 | Lee et al. |
| 2005/0142565 A1 | 6/2005 | Samper |
| 2005/0214532 A1 | 9/2005 | Kosak et al. |
| 2005/0260609 A1 | 11/2005 | Lapidus |
| 2006/0017957 A1 | 1/2006 | Degott et al. |
| 2006/0017959 A1 | 1/2006 | Downer et al. |
| 2006/0056695 A1 | 3/2006 | Wu et al. |
| 2006/0117465 A1 | 6/2006 | Willows et al. |
| 2006/0121181 A1 | 6/2006 | Sleat |
| 2006/0199196 A1 | 9/2006 | O'Banion et al. |
| 2006/0286569 A1 | 12/2006 | Bar-Or et al. |
| 2007/0012784 A1 | 1/2007 | Mercolino |
| 2007/0026239 A1 | 2/2007 | Sigrist et al. |
| 2007/0041622 A1 | 2/2007 | Salva Calcagno |
| 2007/0048761 A1 | 3/2007 | Reep et al. |
| 2007/0072197 A1 | 3/2007 | Rayms-Keller et al. |
| 2007/0117119 A1 | 5/2007 | Akita et al. |
| 2007/0121937 A1 | 5/2007 | Kochevar et al. |
| 2007/0254292 A1 | 11/2007 | Fukasawa et al. |
| 2008/0038813 A1 | 2/2008 | Chen |

(56) References Cited

U.S. PATENT DOCUMENTS

| | | |
|---|---|---|
| 2008/0081357 A1 | 4/2008 | Kwon et al. |
| 2008/0149713 A1 | 6/2008 | Brundage |
| 2008/0153135 A1 | 6/2008 | Liu |
| 2008/0216255 A1 | 9/2008 | Poovey et al. |
| 2008/0248948 A1 | 10/2008 | Hartlep |
| 2008/0290649 A1 | 11/2008 | Klein et al. |
| 2008/0293052 A1 | 11/2008 | Liang et al. |
| 2008/0299559 A1 | 12/2008 | Kwok et al. |
| 2008/0299667 A1 | 12/2008 | Kwok et al. |
| 2008/0312427 A1 | 12/2008 | Kwok et al. |
| 2009/0042191 A1 | 2/2009 | Hayward et al. |
| 2009/0057147 A1 | 3/2009 | Kayyem |
| 2009/0069199 A1 | 3/2009 | Brandenburg |
| 2009/0075261 A1 | 3/2009 | Hayward et al. |
| 2009/0136163 A1 | 5/2009 | Kerr et al. |
| 2009/0220789 A1 | 9/2009 | DeSimone et al. |
| 2009/0222912 A1 | 9/2009 | Boschin |
| 2009/0253127 A1 | 10/2009 | Gaudreau et al. |
| 2009/0286250 A1 | 11/2009 | Hayward et al. |
| 2009/0311555 A1 | 12/2009 | Badyal et al. |
| 2009/0313740 A1 | 12/2009 | Santos et al. |
| 2009/0325234 A1 | 12/2009 | Gregg et al. |
| 2010/0050344 A1 | 3/2010 | Peltz et al. |
| 2010/0065463 A1 | 3/2010 | Taylor |
| 2010/0075407 A1 | 3/2010 | Duffy et al. |
| 2010/0075858 A1 | 3/2010 | Davis et al. |
| 2010/0099080 A1 | 4/2010 | Church et al. |
| 2010/0149531 A1 | 6/2010 | Tang |
| 2010/0240101 A1 | 9/2010 | Lieberman et al. |
| 2010/0250616 A1 | 9/2010 | Kim |
| 2010/0258743 A1 | 10/2010 | Bortolin |
| 2010/0267091 A1 | 10/2010 | Murray et al. |
| 2010/0279282 A1 | 11/2010 | Liang et al. |
| 2010/0285447 A1 | 11/2010 | Walsh et al. |
| 2010/0285490 A1 | 11/2010 | Dees et al. |
| 2010/0285985 A1 | 11/2010 | Liang et al. |
| 2010/0307120 A1 | 12/2010 | Stover |
| 2011/0054938 A1 | 3/2011 | Hood et al. |
| 2011/0165569 A1 | 7/2011 | Macula |
| 2011/0229881 A1 | 9/2011 | Oshima et al. |
| 2011/0250594 A1 | 10/2011 | Liang et al. |
| 2011/0263688 A1 | 10/2011 | Barany et al. |
| 2012/0115154 A1 | 5/2012 | Hampikian |
| 2012/0264742 A1 | 10/2012 | Furuishi et al. |
| 2013/0040150 A1 | 2/2013 | Trexler et al. |
| 2013/0040381 A1 | 2/2013 | Gregg et al. |
| 2013/0046994 A1 | 2/2013 | Shaw |
| 2013/0048731 A1 | 2/2013 | Flickner et al. |
| 2013/0109596 A1 | 5/2013 | Peterson et al. |
| 2013/0149706 A1 | 6/2013 | Kwok et al. |
| 2013/0222559 A1 | 8/2013 | Lebaschi et al. |
| 2013/0234043 A1 | 9/2013 | Hussain et al. |
| 2013/0274129 A1 | 10/2013 | Katzen et al. |
| 2014/0099643 A1 | 4/2014 | Jung et al. |
| 2014/0106357 A1 | 4/2014 | Berrada et al. |
| 2014/0224673 A1 | 8/2014 | Alocilja |
| 2014/0256881 A1 | 9/2014 | Berrada et al. |
| 2014/0272097 A1 | 9/2014 | Jung et al. |
| 2014/0295423 A1 | 10/2014 | Liang et al. |
| 2015/0018538 A1 | 1/2015 | Berrada et al. |
| 2015/0030545 A1 | 1/2015 | Grass et al. |
| 2015/0083797 A1 | 3/2015 | Tran et al. |
| 2015/0104800 A1 | 4/2015 | Lee et al. |
| 2015/0107475 A1 | 4/2015 | Jung et al. |
| 2015/0110342 A1 | 4/2015 | Suzuki |
| 2015/0125949 A1 | 5/2015 | Liss |
| 2015/0133319 A1 | 5/2015 | Fu et al. |
| 2015/0141264 A1 | 5/2015 | Jung |
| 2015/0191799 A1 | 7/2015 | Liang et al. |
| 2015/0232952 A1 | 8/2015 | Sun et al. |
| 2015/0266332 A1 | 9/2015 | Szczepanik et al. |
| 2015/0275271 A1 | 10/2015 | Berrada et al. |
| 2015/0302713 A1 | 10/2015 | Berrada et al. |
| 2015/0304109 A1 | 10/2015 | Tran et al. |
| 2015/0329856 A1 | 11/2015 | Liang et al. |
| 2016/0076088 A1 | 3/2016 | Tran et al. |
| 2016/0102215 A1 | 4/2016 | Hayward et al. |
| 2016/0168781 A1 | 6/2016 | Tran et al. |
| 2016/0246892 A1 | 8/2016 | Murrah et al. |
| 2016/0264687 A1 | 9/2016 | Tran |
| 2016/0326511 A1 | 11/2016 | Berrada et al. |
| 2016/0362723 A1 | 12/2016 | Jung et al. |
| 2017/0021611 A1 | 1/2017 | Jung et al. |

FOREIGN PATENT DOCUMENTS

| | | |
|---|---|---|
| EP | 0623658 A2 | 11/1994 |
| EP | 0477220 B1 | 9/1996 |
| EP | 0840350 A2 | 5/1998 |
| EP | 1063286 A1 | 12/2000 |
| EP | 1231470 A1 | 8/2002 |
| EP | 1237327 A2 | 9/2002 |
| EP | 1403333 A1 | 3/2004 |
| EP | 1847316 A1 | 10/2007 |
| EP | 2428925 A1 | 3/2012 |
| EP | 2444136 A1 | 4/2012 |
| EP | 2444546 A1 | 4/2012 |
| GB | 2319337 A | 5/1998 |
| GB | 2434570 A | 8/2007 |
| JP | 63-503242 | 11/1988 |
| JP | 2009517250 A | 4/2009 |
| JP | 2011036278 A | 2/2011 |
| JP | 2013235553 A | 11/2013 |
| RU | 2084535 C1 | 7/1997 |
| RU | 2170084 C1 | 7/2001 |
| WO | WO87/06383 A1 | 10/1987 |
| WO | WO90/14441 A1 | 11/1990 |
| WO | WO92/04469 A2 | 3/1992 |
| WO | WO95/02702 A1 | 1/1995 |
| WO | WO95/06249 A1 | 3/1995 |
| WO | WO97/04392 A1 | 2/1997 |
| WO | WO97/45539 A1 | 12/1997 |
| WO | WO98/06084 A1 | 2/1998 |
| WO | WO98/16313 A1 | 4/1998 |
| WO | WO99/45514 A1 | 9/1999 |
| WO | WO99/59011 A1 | 11/1999 |
| WO | WO00/55609 A2 | 9/2000 |
| WO | WO00/61799 A2 | 10/2000 |
| WO | WO01/25002 A1 | 4/2001 |
| WO | WO01/36676 A2 | 5/2001 |
| WO | WO01/99063 A1 | 12/2001 |
| WO | WO02/057548 A1 | 7/2002 |
| WO | WO02/066678 A2 | 8/2002 |
| WO | WO02/084617 A1 | 10/2002 |
| WO | WO03/016558 A1 | 2/2003 |
| WO | WO03/030129 A2 | 4/2003 |
| WO | WO03030129 A2 | 4/2003 |
| WO | WO03/038000 A1 | 5/2003 |
| WO | WO03/080931 A1 | 10/2003 |
| WO | WO2004/025562 A1 | 3/2004 |
| WO | WO2004/086323 A1 | 10/2004 |
| WO | WO2004087430 A1 | 10/2004 |
| WO | WO2005/075683 A1 | 8/2005 |
| WO | WO2005/103226 A2 | 11/2005 |
| WO | WO2005108103 A2 | 11/2005 |
| WO | WO2006/109014 A1 | 10/2006 |
| WO | WO2007037586 A1 | 4/2007 |
| WO | WO2007/078833 A2 | 7/2007 |
| WO | WO2008/007060 A1 | 1/2008 |
| WO | WO2008045288 A2 | 4/2008 |
| WO | WO2008/154931 A1 | 12/2008 |
| WO | WO2009/027806 A1 | 3/2009 |
| WO | WO2011/005222 A1 | 1/2011 |
| WO | WO2012/076021 A1 | 6/2012 |
| WO | WO2013/052924 A1 | 4/2013 |
| WO | WO2013/154943 A1 | 10/2013 |
| WO | WO2013/170009 A1 | 11/2013 |

(56) References Cited

FOREIGN PATENT DOCUMENTS

| WO | WO2014/062754 A1 | 4/2014 |
|---|---|---|
| WO | WO 2014006726 A1 | 6/2016 |

OTHER PUBLICATIONS

Van De Rijke, Frans, et al., "Up-converting phosphor reporters for nucleic acid microarrays", Nature Publishing Group, Nature Biotechnology 19, Mar. 2001, 273-276.
Whitcombe, David, et al., "Detection of PCR products using self-probing amplicons and fluorescence", Nature Biotechnology, vol. 17, Aug. 1999, p. 804-807.
Hunicke-Smith, Scott P., "PCR and Cycle Sequencing Reactions: A New Device and Engineering Model", Dissertation, Stanford University, pp. i-xiv and 1-200, May 1997.
Annex 5, WHO good Distribution Practices for Pharmaceutical Products, WHO Technical Report Series, No. 957, pp. 235-264 (2010).
Notice of Reasons for Rejection issued in Japanese Patent Application No. JP2016-562831 dated Jul. 3, 2017.
Supplementary European Search Report for corresponding European Application No. EP15765671, p. 1-7, Oct. 30, 2017.
Extended European Search Report issued in European Patent Application No. 14852842.5 dated Jun. 12, 2017.
International Preliminary Report on Patentability issued in PCT/US2013/065161 dated Apr. 21, 2015.
Kim, Jeong Ah et al., "Fabrication and Characterization of a PDMS-Glass Hybrid Continuous-Flow PCR Chip", Biochemical Engineering Journal, 29, 91-97 (2006).
Curcio, Mario et al., "Continuous Segmented-Flow Poymerase Chain Reaction for High-Throughput Miniaturized DNA Amplification" Analytical Chemistry, vol. 75, No. 1, 1-7 ( Jan. 1, 2003).
Kopp, Martin U. et al, "Chemical Amplification: Continuous-Flow PCR on a Chip", Science, vol. 280, 1046-1048 (1998).
Skirtach, Andre, G. et al, "The Role of Metal Nanoparticles in Remote Release of Encapsulated Materials", Nano Letters, vol. 5, No. 7, 1371-1377 (2005).
Fixe, F. et al., 37 Thin Film Micro Arrays with Immobilized DNA for Hybridization Analysis, Mat. Res. Soc. Symp. Proc. vol. 723, Materials Research Society, O2.3.1-O2.3.6 (2002).
Hayward, Jim et al., "A Scaled, Integrative Implementation for DNA Marking of Integrated Circuits", Applied DNA Sciences, 1-25 (2013).
Ovsianikov, Aleksandr et al., "Two-Photon Polymerization Technique for Microfabrication of CAD-Designed 3D Scaffolds from Commercially Available Photosensitive Materials", Journal of Tissue Engineering and Regenerative Medicine, 1:443-449 (2007).
Khandjian, E.W., "Optimized Hybridization of DNA Blotted and Fixed to Nitrocellulose and Nylon Membranes" Biotechnology, vol. 5, 165-167 (1987).
Chrisey, Linda A et al., "Fabrication of Patterned DNA Surfaces", Nucleic Acids Research, vol. 24, No. 15, 3040-3047 (1996).
Wollenberger, Louis V. et al.,"Detection of DNA Using Upconverting Phosphor Reporter Probes", SPIE, vol. 2985, 100-111 (1997).
Takara Bio, "Takara Bio to Produce DNA Fragments for DNA Microarrays on Industrial Scale", http://www.evaluategroup.com/Universal/View.aspx?type_Story&id.
Obeid, Pierre J. et al., "Microfabricated Device for DNA and RNA Amplification by Continuous-Flow Polymerase Chain Reaction and Reverse Transcription-Polymerase Chain Reaction with Cycle Number Section", Anal. Chem, 75, 288-295 (2003).
Supplemental European Search Report for Corresponding European Patent Application No. EP14820538.8, pp. 1-8 (Jan. 25, 2017).
Hashimoto, Masahiko et al., "Rapid PCR in a Continuous Flow Device", Lab Chip, 4, 638-645 (2004).
Thibaudau, Franck, "Ultrafast Photothermal Release of DNA from Gold Nanoparticles", J. Phys. Chem. Lett. 3, 902-907 (2012).
Berger, S.A. et al., "Flow in Curved Pipes", Ann. Rev. Fluid Mech., 15:461-512 (1983).

Written Opinion of the International Search Authority for PCT/US2015/013084 dated Apr. 17, 2015.
Ageno, M., et al., "The Alkaline Denaturation of DNA", Biophys J., Nov. 1969; 9(11): 1281-1311.
Hou, Sen, et al., "Method to Improve DNA Condensation Efficiency by Alkali Treatment", Taylor & Francis, Nucleosides, Nucleotides and Nucleic Acids, 28:725-735, 2009.
Thiel, Teresa, et al., "New zwitterionic butanesulfonic acids that extend the alkaline range of four families of good buffers: Evaluation for use in biological systems", J. Biochem. Biophys., Methods 37 (1998) 117-129.
Schulz, M.M., et al., "Archived or directly swabbed latent fingerprints as a DNA source for STR typing", Forensic Science International 127 (2002) 128-130.
Park, H., et al., "Stress response of fibroblasts adherent to the surface of plasma-treated poly(lactic-co-glycolic acid) nanofiber matrices", Colloids Surf B Biointerfaces, May 1, 2010, 1;77(1); 90-5.
WiseGeek, "How Many Species of Bacteria Are There", http://www.wisegeek.org/how-many-species-of-bacteria-are-there.htm.
Wikipedia, "List of sequenced bacterial genomes", http://en.wikipedia.orgiwiki/List_of_sequenced_bacterial_genomes.
Wikipedia, "Virus", http://en.wikipedia.org/wiki/Virus.
Agrawal, Sudhir, et al., "Site-Specific Functionalization of Oligodeoxynucleotides for Non-Radioactive Labelling", Tetrahedron Letters, vol. 31, No. 11, pp. 1543-1546, 1990.
Beija, Mariana, et al., "Synthesis and applications of Rhodamine derivatives as fluorescent probes", Chem. Soc. Rev., 2009, 38, 2410-2433.
Corstjens, P.L.A.M., et al., "Infrared up-converting phosphors for bioassays", IEE Proc.-Nanobiotechnol., vol. 152, No. 2, Apr. 2005.
Tyagi, Sanjay, et al., "Multicolor molecular beacons for allele discrimination", Nature Biotechnology, vol. 16, Jan. 1996.
Gibson, U.E., et al., "A novel method for real time quantitative RT-PCR", Genome Res., 1996, 6:995-1001.
Gupta, K.C., et al., "A general method for the synthesis of 3'-sulfhydryl and phosphate group containing oligonucleotides", Nucleic Acids Research, vol. 19, No. 11, p. 3019-3025 (1991).
Heid, C.A., et al., "Real time quantitative PCR", Genome Res. 1996 6:986-994.
Holland, Pamela, M., et al., "Detection of specific polymerase chain reaction product by utilizing the 5' → 3' exonuclease activity of Thermus aquaticus DNA polymerase", Proc. Natl. Acad. Sci. USA, vol. 88, pp. 7276-7280, Aug. 1991, Biochemistry.
Hosokawa, Kazuo, et al., "DNA Detection on a Power-free Microchip with Laminar Flow-assisted Dendritic Amplification", Analytical Sciences, Oct. 2010, vol. 26.
Hussein, Ebtissam, H.A., et al., "Molecular Characterization of Cotton Genotypes Using PCR-based Markers", Journal of Applied Sciences Research, 3(10): 1156-1169, 2007.
Ibrahim, Rashid Ismael Hag, et al., "Complete Nucleotide Sequence of the Cotton (Gossypium barbadense L.) Chloroplast Genome with a Comparative Analysis of Sequences among 9 Dicot Plants", Genes Genet. Syst. (2006) 81, p. 311-321.
Jiang, Chun-Xiao, et al., "Polyploid formation created unique avenues for response to selection in Gossypium (cotton)", Proc. Natl. Acad. Sci. USA, vol. 95, pp. 4419-4424, Apr. 1998.
Kaneda, Shohei, et al., "Modification of the Glass Surface Property in PDMS-Glass Hybrid Microfluidic Devices", Analytical Sciences, Jan. 2012, vol. 28.
Karahan, H.A., et al., "Improvements of Surface Functionality of Cotton Fibers by Atmospheric Plasma Treatment", Fibers and Polymers 2008, vol. 9, No. 1, 21-26.
Lee, Seung-Bum, et al., "The complete chloroplast genome sequence of Gossypium hirsutum: organization and phylogenetic relationships to other angiosperms", BMC Genomics 2006, 7:61.
Lee, Linda G., et al., "Allelic discrimination by nick-translation PCR with fluorogenic probes", Nucleic Acids Research, 1993, vol. 21, No. 16, 3761-3766.
Tyagi, Sanjay, et al., "Molecular Beacons: Probes that Fluoresce upon Hybridization", Nature Biotechnology, vol. 18, Mar. 1996.

(56) References Cited

OTHER PUBLICATIONS

Sproat, Brian S. et al., "The synthesis of protected 5'-mercapto-2', 5'-dideoxyribonucleoside-3'-O-phosphoramidites; uses of 5'-mercapto-oligodeoxyribonucleotides", Nucleic Acids Research, vol. 15, No. 12, 1987.

Nazarenko, I.A., et al., "A closed tube format for amplification and detection of DNA based on energy transfer", Nucleic Acids Research, 1997, vol. 25, No. 12, 2516-2521.

Nelson, Paul S., et al., "Bifunctional oligonucleotide probes synthesized using a novel CPG support are able to detect single base pair mutations", Nucleic Acids Research, vol. 17, No. 18, 1989.

Yang, XF, et al., "Fluorimetric determination of hemoglobin using spiro form rhodamine B hydrazide in a micellar medium", Talanta Nov. 12, 2003; 61(4): 439-45.

Written Opinion of the International Searching Authority issued in PCT/US15/21165 dated Jul. 2, 2015.

Tuzlakoglu, K., et al., "A new route to produce starch-based fiber mesh scaffolds by wet spinning and subsequent surface modification as a way to improve cell attachment and proliferation", Journal of Biomedical Materials Research Part A, 2009, Wiley Periodicals, Inc, p. 369-377.

Zuckermann, Ronald, et al., "Efficient methods for attachment of thiol specific probes to the 3'-ends of synthetic oligodeoxyribonucleotides", Nucleic Acids Research, vol. 15, No. 13, 1987.

* cited by examiner

Number of Unique Codes

| LEVELS | NUMBER OF WAVELENGTH BANDS | | | | | | | | |
|---|---|---|---|---|---|---|---|---|---|
| | 2 | 3 | 4 | 5 | 6 | 7 | 8 | 9 | 10 |
| 2 | 3 | 7 | 15 | 31 | 63 | 127 | 255 | 511 | 1023 |
| 3 | 5 | 19 | 65 | 211 | 665 | 2059 | 6305 | 19171 | 58025 |
| 4 | 7 | 37 | 175 | 781 | 3367 | 14197 | 58975 | 242461 | 989527 |
| 5 | 9 | 61 | 369 | 2101 | 11529 | 61741 | 325089 | 1690981 | 8717049 |
| 6 | 11 | 91 | 671 | 4651 | 31031 | 201881 | 1288991 | 8124571 | 50700551 |
| 7 | 13 | 127 | 1105 | 9031 | 70993 | 543607 | 4085185 | 30275611 | 2.22E+08 |
| 8 | 15 | 169 | 1695 | 15961 | 144495 | 1273609 | 11012415 | 93864121 | 7.91E+08 |
| 9 | 17 | 217 | 2465 | 26281 | 269297 | 2685817 | 26269505 | 2.53E+08 | 2.41E+09 |
| 10 | 19 | 271 | 3439 | 40951 | 468559 | 5217031 | 56953279 | 6.13E+08 | 6.51E+09 |

FIG. 4

MULTIMODE IMAGE AND SPECTRAL READER

CROSS-REFERENCE TO RELATED APPLICATIONS

This application is a continuation of U.S. patent application Ser. No. 15/027,454 filed on Apr. 6, 2016, which is a U.S National Phase Application of International Application No. PCT/US2014/059408 filed on Oct. 7, 2014, and claims the benefit of U.S. Provisional Application No. 61/887,797, filed on Oct. 7, 2013 the disclosures of which are incorporated by reference herein in their entirety.

TECHNICAL FIELD

The invention relates to a reader instrument capable of reading multiple forms of markers, indicia types and inherent energy-emitting properties of an item. The markers, indicia and other properties are useful as overt or covert security markers or for steganographic encryption of the identity or other characteristics of an object or item with which such markers, indicia and properties, such as a logo are affixed or otherwise associated. Multi-mode readers of markers, indicia and other properties are useful for decoding encrypted information for rapid tracking, identification and verification of marked goods and high value items.

BACKGROUND

Security markers have been employed for the identification, tracking and authentication of items of interest, high value articles and merchandise etc., see for instance U.S. Pat. No. 8,415,164: System and method for secure document printing and detection; U.S. Pat. No. 8,426,216: Method for authenticating articles with optical reporters; and U.S. Pat. No. 8,124,333: Methods for covalent linking of optical reporters.

One commonly used type of marker or identification tag is a barcode. A barcode is a representation of data by varying the widths and spacing of parallel lines, sometimes stacked in a two-dimensional pattern. When used as an identification tag on an object, the barcode carries encoded information relevant to that object that can be read by a barcode decoder or reader. (See for example U.S. Pat. No. 8,368,878 Method, apparatus, and article to facilitate evaluation of objects using electromagnetic energy to Furness et al., and U.S. Pat. No. 8,285,510 Method, apparatus, and article to facilitate distributed evaluation of objects using electromagnetic energy to Schowengerdt et al.).

Another commonly used type of barcode is the QR code ("Quick Read" codes). QR codes were first used by Denso, a Toyota subsidiary to track automobiles during manufacturing by allowing their contents to be decoded at high speed. QR codes became one of the most popular two-dimensional barcodes. Unlike the original barcode that was designed to be interrogated by a beam of light, the QR code is detected as a 2-dimensional digital image by a semiconductor-based image sensor that can be digitally analyzed by a programmed processor. The processor locates reference squares at three corners of the QR code, and processes the image after normalizing its size, orientation, and angle of viewing. The small bars in the code can then be converted to binary numbers and their validity checked with an error-correcting code.

Still another commonly used identification code or tag is the RFID (radio-frequency identification) tag. RFID tags store data electronically or as a bit stream which can be read wirelessly by machine outside a line of sight. See for example U.S. Pat. No. 6,043,746 to Microchip Technologies Incorporated. RFIDs can be extended range RFIDs: see for instance, U.S. Pat. No. 6,147,606 or for restricted range RFIDs, see for instance, U.S. Pat. No. 6,097,301. Unlike barcodes, RFIDs need not be in a line of sight of the reader and can even be embedded in the object being interrogated.

Although these identification tags are useful for generic identification and tracking, they can be easily copied. There is a need for more secure forms of taggant verification for authentication of tagged objects, particularly high value merchandise.

When electronic components are obsolete, replacements are usually obtained from authorized suppliers. These suppliers search for parts from their own stock, contractor or government excess stock, and often from internet listing sites which list available components. Components from all locations, and in particular from internet listing sites, are at high risk for being counterfeited. Used, scrapped semiconductor electronic components are removed from circuit boards in a fashion that often subjects the parts to both thermal and electrostatic stresses beyond the manufacturer's recommended limits. In addition, generic components of this type (e.g., memory devices, amplifiers and voltage regulators), which have many versions from multiple manufacturers, may be remarked to falsely identify the parts as having greater than actual capability (e.g., capacity, speed, power dissipation and temperature range). This risk is present for all purchases from unauthorized suppliers, regardless of the obsolescence status. However, the risk for active parts is most easily mitigated through maximum use of authorized suppliers.

Most counterfeit electronic components are subjected to some level of remarking. This is done because new electronic components are generally packaged with all the parts in one shipment produced from a small number (two or less) of production batches. These batches are usually identified through a lot or date code designator on the component part that can be used to identify the approximate time-frame, and often the facility, which produced the component. Counterfeiters often re-mark product, even if it is the correct part number, in order to make the entire shipment appear as if it was from one lot or date code.

The Original Equipment Manufacturers (OEMs) or "primes" as they are sometimes called, are the last point for elimination of counterfeits before they appear in the operational environment. In one case, an aerospace manufacturer was subjected to intense scrutiny for its failure to detect the presence of counterfeit electronic parts in aircraft sold to the Defense Department. This is a critical problem for OEMs, as they experience spiking costs related to counterfeits, both explicit and hidden costs.

The directly attributable costs of counterfeits to the Original Component Manufacturers start, but only start, with loss of revenue, licensing fees, and royalties when a potential customer purchases a counterfeit part instead of the original. There is in effect a nameless competitor, siphoning revenue and market share, all of which may come in at about 2% of the total addressable semiconductor market. This would amount to $6B in the global semiconductor market of over $300B in 2011.

As in all quality control, the cost of eliminating defects increases sharply as a product moves toward, and then, into service. By this estimate, remediation of counterfeiting is estimated to cost ten times the product cost if found at the board check stage, one hundred times the product cost if found at equipment final test, and a thousand times the product cost if the defective part is found in service. These problems relate to inappropriate marking of used or substandard parts, but an even more serious problem relates to malware that may be introduced in an electronic component part that is marked as newly produced by an original equipment manufacturer. Exclusion of such malware by an effective security marking system is a critical need. Other electronic and non-electronic articles of interest are also regularly subject to imitation or counterfeit substitutions. Additional coding techniques and methods of identification, tracking and authentication of items of interest, high value articles and merchandise etc. are in constant demand to stay ahead of the threat posed by counterfeit items and products.

SUMMARY

The present inventive concept provides a multi-mode reader instrument capable of detecting a signal from one or more taggants, including a marker, or other indicia on an object of interest, or a property of the object itself, wherein the one or more taggants are independently selected from a microdot, a bar code, a QR code, an RFID tag, an optical compound, a fluorescent compound, a phosphorescent compound, a DNA taggant, an upconverting phosphor (UCP), a chemical dye, a radioactive compound, a digitized image of all or part of the object and a property of the object, such as a thermal attribute of the object. The taggant may include a taggant identifier, which may include one or more of an optical reporter, a digital code, a QR code or a bar code. The optical reporter may include one or more of an upconverting phosphor, a fluorophore, an encrypted fluorophore (requiring a developer to reveal the fluorescence), a dye, a stain, or a phosphor. The multi-mode reader instrument may be handheld or portable. The rapid determination of data from the multimode reader can be used to discriminate those objects or articles of commerce for verification of a marker with the highest level of security, such as a nucleic acid marker, e.g. DNA in an in-field detection system or a laboratory test, such as PCR amplicon analysis, DNA sequencing or sequence specific hybridization.

In another embodiment of the multi-mode reader, the signals from the taggants on the object are captured simultaneously as images from each of the plurality of sensors. In a particular embodiment, one of the signals is designated as a reference signal and the other one or more of the signals are informational signals. In another embodiment of the multi-mode reader instrument, the informational signals are calibrated by comparison with the reference signal. The signal may be an electromagnetic signal reflected or emitted from the object. The electromagnetic signal may be any suitable electromagnetic signal such as an optical signal (visible, infrared, ultraviolet etc.), or an electromagnetic signal outside of the optical range, such as radio waves, microwaves, X-rays or gamma rays reflected or emitted after excitation by illumination or irradiation of the taggant on the object marked with a taggant or indicia. The informational signals can be wavelength and amplitude of an electromagnetic signal, pattern recognition of an image or alphanumeric characters or one or two dimensional bar code patterns.

In another embodiment, the invention provides a method of accessing data from an object, the method includes obtaining data from a multi-mode reader instrument reading signals from one or more markers, indicia, taggants or properties on or from an object, the markers, indicia or taggants being selected from a microdot, a bar code, a QR code, an RFID, an optical compound, a fluorescent compound, a phosphorescent compound, a DNA taggant, an upconverting phosphor (UCP), a chemical dye, a digitized image, a radioactive compound and a thermal attribute, such as black body radiation or heat emission from the object. In one embodiment, the data obtained by the method comprises data that can be used for authentication of a unique object or product, or for verification of properties, components, manufacturing or production information relating to the object or product.

In still another embodiment, the invention provides a system for identifying an object, the system includes a multi-mode reader instrument capable of detecting data from a signal from one or more markers, indicia, taggants or properties on or from an object, the markers, indicia or taggants being selected from a bar code, a QR code, an RFID, an optical compound, a fluorescent compound, a phosphorescent compound, a DNA taggant, an upconverting phosphor (UCP), a chemical dye, a digitized image, a radioactive compound, an olfactory compound (e.g. in scratch and release microcapsules for human or animal detection, such as by a police dog of a K9 unit) and a thermal attribute of the object; operatively connected to a database for storing the data from the multi-mode reader instrument or accessing contextual data about the item based on its marker, indicia, taggant or property identifier.

DETAILED DESCRIPTION

In one embodiment the inventive concept of the present invention provides a multi-mode reader instrument capable of detecting data from a signal from one or more taggants, including markers, or other indicia on an object, or properties of the object itself, wherein the one or more taggants are independently selected from a bar code, a microdot, a QR code, an RFID tag, an optical compound, a fluorescent compound, a phosphorescent compound, a DNA taggant, an upconverting phosphor (UCP), a chemical dye, a digitized image, a radioactive compound, an olfactory compound (e.g. in scratch and release microcapsules) and a thermal attribute of the object and wherein the signals are captured as an image in each of a plurality of sensors capable of detecting electromagnetic or olfactory signals from the taggant or taggants on the object.

In one embodiment, the multi-mode reader instrument includes a plurality of sensors each capable of detecting electromagnetic signals from one or more taggants on an object. The taggants can be any suitable taggant selected from a microdot, a bar code, a QR code, an RFID tag, an optical compound, a fluorescent compound, a phosphorescent compound, a DNA taggant, an upconverting phosphor (UCP), a chemical dye, a digitized image, a radioactive compound, an olfactory compound, a thermal attribute of the object, and the like.

In yet another embodiment the invention provides a multi-mode reader instrument further comprising a sensor for detecting the position of a taggant locator for indicating the position of at least one of the one or more taggants on the object. In another embodiment the invention provides a multi-mode reader instrument wherein the taggant locator is detected as a signal selected from the group consisting of a visible signal, a fluorescent signal, a radioactive signal, a phosphorescent signal and a thermal signal. In another embodiment the invention provides a multi-mode reader instrument capable of detecting a taggant locator selected from the group consisting of a logo, a trademark, a bar code, a scratch-off code and an RFID tag.

In another embodiment of the multi-mode reader instrument, the signals from the one or more taggants on the object are scanned simultaneously along two intersecting axes. The axes may be at any angle to each other, such as an acute angle, at an obtuse angle, or perpendicular to each other. Alternatively, the scans may be duplicates along the same axis taken at different times. In another alternative, the one or more taggants on the object are recorded as images by a plurality of cameras, each having a different filter limiting the signal to a different range of wavelengths.

In still another embodiment the invention provides a multi-mode reader instrument capable of recording data from the signals detected from the one or more taggants on the object. In another embodiment the invention provides a multi-mode reader instrument wherein the data determined from the one or more taggants on the object is stored in a memory device within the multi-mode reader instrument or communicated to a server for comparison with stored data.

In another embodiment the invention provides a multi-mode reader instrument further comprising a screen for viewing a taggant locator or at least one of the signals detected from the one or more taggants on the object. In another embodiment the invention provides a multi-mode reader instrument further comprising an optional filter for limiting the signal detected by the sensor, each filter independently limiting the signal detected to a range of wavelengths characteristic of the filter. The ranges of wavelengths limited by the filters may be overlapping or non-overlapping wavelength ranges.

In another embodiment the invention provides a multi-mode reader instrument wherein one or more of the plurality of sensors each have a filter for limiting the signal detected by the sensor, wherein the filters limit the signal detected by the sensor to different wavelength ranges. In another embodiment the filters each limit the signal wavelength to a bandwidth of from about 1 nm to about 100 nm. In another embodiment the filters each limit the signal wavelength to a bandwidth of from about 5 nm to about 75 nm. In another embodiment the filters each limit the signal wavelength to a bandwidth of from about 10 nm to about 50 nm. In another embodiment the invention provides a multi-mode reader instrument wherein the filters each limit the signal wavelength to a bandwidth within a wavelength range from about 250 nm to about 1,000 nm.

In another embodiment the invention provides a multi-mode reader instrument wherein the user can manually select one or more of a plurality of sensors to preselect which of the sensors is or are activated (e.g. a bar code reader, or a bar code reader and a sensor capable of detecting a signal in a specific waveband, such as a 20 nm band around a wavelength of 425 nm, or 680 nm). Alternatively, the user can activate a full set of sensors available on board the multi-mode reader instrument so that all available signal detectors provide a signal readout. In each case the readout may be displayed to the user on a screen, or transmitted to a server for comparison with a database of unique encoded signals specific to particular objects of interest.

In another embodiment the invention provides a system for identifying an object, the system including: a multi-mode reader instrument, comprising a plurality of sensors capable of detecting electromagnetic signals from one or more taggants on an object and converting the signals to signal data; and an electronic circuit capable of receiving the signal data and outputting the signal data in coded form for storage; wherein the electronic circuit is operatively linked to a database for receiving the coded form of the data from the multi-mode reader instrument for storage and retrieval. In another embodiment the database is maintained on a computer-readable medium within the reader instrument or on a server independent of the reader instrument. In another embodiment, the database is searchable in order to identify the markers, indicia or taggants on the object. In another embodiment, the database is searchable in order to identify the properties of the object related to its identity, properties, chain of custody, and/or trace authentication identifiers.

In one embodiment, the present invention provides a multi-mode reader instrument capable of detecting data from a signal from one or more markers, indicia, taggants or other inherent properties on or from an object, the markers, indicia, taggants or properties being selected from a bar code, a QR code, an RFID chip, an optical compound, a fluorescent compound, a phosphorescent compound, a DNA taggant, an upconverting phosphor (UCP), a chemical dye, a digitized image, a radioactive compound, an olfactory compound and a thermal attribute of the object. Other forms of markers or indicia useful in the practice of the present invention include optical markers, e.g. colored compounds having characteristic absorption and emission spectra; ultraviolet (UV) absorbing and infrared absorbing compounds. Trademarks and logos can also be used.

In still another embodiment, the invention provides a method of identification and/or authentication of an object: the method includes providing a primary taggant encoding a readable encrypted first identifier of the object, such as for instance a DNA molecule having an authentication sequence, encrypted by a first method; providing a secondary taggant encoding a readable encrypted second identifier, such as the encrypted digital DNA sequence of the object, encrypted by a second method; providing a searchable secure database encoding the second identifier of the object and optionally other contextual information about the object such as chain of custody history, quality control test results and other characteristics; reading the first identifier and the second identifier and accessing the database to search for the encrypted second identifier; comparing the reading of the first identifier with the second identifier from the searchable secure database; and thereby identifying the object as authentic or counterfeit. In one embodiment of the above-disclosed method, the primary taggant includes one or more of a nucleic acid, an amino acid, a peptide, a protein, a trace element or the like. In another embodiment of the methods of the invention, the primary taggant includes a nucleic acid, and the nucleic acid includes a sequence encoding the readable first identifier. In still another embodiment, the secondary taggant is a digital identifier that can be encrypted and can be included in a barcode, a QR code or an RFID.

In another embodiment, the invention provides a method of verification of the authenticity of an object: the method includes providing a primary taggant encoding a readable encrypted first identifier of the object, such as for instance a DNA molecule having an authentication sequence, encrypted by a first method; providing a secondary taggant encoding a readable encrypted second identifier, such as the encrypted digital DNA sequence of the object, encrypted by a second method; providing a searchable secure database encoding the second identifier of the object and optionally other contextual information about the object such as chain of custody history, quality control test results and other characteristics; reading the second identifier and accessing the database to search for the encrypted second identifier; matching the reading of the second identifier with an identifier from the searchable secure database; and thereby identifying the object as authentic. As a second optional step, the encrypted first identifier can be read and compared to the identifier listed in the database for authentication as further confirmation of the authenticity of the object.

In another embodiment, the invention provides a system for identification and/or authentication of an object, the system includes a primary taggant encoding a readable encrypted first identifier of the object, such as for instance a DNA molecule having an authentication sequence, encrypted by a first method; a secondary taggant encoding a readable encrypted second identifier, such as the encrypted digital DNA sequence of the object, encrypted by a second method; and a searchable secure database encoding the second identifier of the object. In one embodiment of the above-disclosed system, the primary taggant includes one or more of a nucleic acid, an amino acid, a peptide, a protein, a trace element or the like. In another embodiment of the system of the invention, the primary taggant includes a nucleic acid, and the nucleic acid includes a sequence encoding the readable first identifier. In still another embodiment, the secondary taggant is a digital identifier that can be encrypted and can be included in a barcode, a QR code or an RFID.

The ability to access multiple signals from a single taggant on an object permits the coding of an unlimited amount of information that may be useful to different parties at different points in the stream of commerce. For instance, it may be useful for manufacturers to encode production dates, sources and components in their products (this was the origin of bar coding); subsequently this information and additional shipping and tracking information, such as timing and location may be useful to distributers and vendors; and finally such as information relating to origin, composition and authentication may be of interest to purchasers and consumers. All of the aforementioned data may be encoded in a single taggant by adding markers encoding the new information at the taggant location, e.g. by serially adding new nucleic acid molecule markers and/or optical markers and/or digital representations within an overt or covert barcode, or any combination thereof.

The methods and systems of the present invention provide authentication by adding layers of security on a tag or taggant (the terms "tag" and "taggant" are used interchangeably herein) directly onto an object or item of interest by embedding physical encryption taggants as well as encrypting their digital representatives directly into the content of the taggant. The item, object or merchandise marked with the taggant can be any suitable article or item such as, for instance, a microchip, a label, a badge, a logo, a printed material, a document, a thread, a yarn, textile, an ink or a solution to name but a few. In one embodiment, the item is an item selected from the group consisting of cash, a currency note, a coin, a gem, an item of jewelry, a musical instrument, a passport, an antique, an item of furniture, artwork, a collectible item, memorabilia, a property deed, a stock certificate, or a bond certificate. The marked item can be an inventory item or non-inventoried item in transit. Alternatively, the imitation or counterfeit article or item may be a product, an object, a commodity, a liquid, or even a gas. The marked article or item may be any article or item such as a high value item or a unique item, or an item or object having a critical function.

Merchandise and other items or objects of interest can be tracked and authenticated using markers and indicia carrying encrypted information related to the item bearing the particular marker or indicia. The terms "marker" and "indicia" are used interchangeably herein. There are many types of markers or indicia useful for encoding product information. Merchandise and other objects can also be identified and authenticated using inherent properties which emit energy in a passive (does not require excitation) or active (requires excitation) mode, such as spectral, thermal, olfactory or radio frequency modes.

The DNA security solutions of the present invention protect products, brands and intellectual property from counterfeiting and diversion. DNA represents a highly stable molecule that can be attached to multiple component materials in its natural state or after mild chemical modification. Another attractive feature is the ease with which DNA can be amplified by polymerase chain reaction (PCR), or isothermal amplification (see for instance, Gill et al. *Nucleic Acid Isothermal Amplification Technologies—A Review*, Nucleosides, nucleotides and nucleic acids (2008) 27(3): 224-243) allowing for significant quantities to be produced in a short time. The sequence and size complexity of DNA can provide a unique mark that can distinguish between individual components, different manufacturers, and dates of manufacture. Importantly, in the context of forensic identification and authentication, DNA represents the "gold standard". The scope of use of DNA taggant technology continues to increase as new applications emerge.

It was reported in 2012, that the incidence of counterfeiting in the global electronics supply chain had quadrupled in just two years from 2009 to 2011. Based on this disturbing and costly trend, when President Obama signed the National Defense Authorization Act in 2012, a provision was added that addressed the issue of counterfeit electronics (see NDAA 2012). The provision mandated that an Applied DNA Sciences' DNA taggant to be present on all Defense Logistics Agency purchase parts within Federal Supply Class 5962. This anti-counterfeiting provision placed the responsibility for the sale of authentic components to government and military customers on the supplier, whether the supplier is a manufacturer or a distributor.

In one embodiment the present invention provides a DNA-secured form of the encrypted code, which can be by any suitable encryption method and coded in a secure format, such as for example, a QR code or an RFID: See for instance, international patent application No. WO2013/170009 Verification of Physical Encryption Taggants Using Digital Representatives and Authentications thereof. The encrypted information corresponds to the DNA authentication sequence and can be encrypted in any suitable coding system, such as, and without limitation, an Advanced Encryption Standard, Secure Hash Algorithm, 3DES, Aria, Blowfish, Camellia, CAST, CLEFIA, CMAC, Ghost 28147, RFC 4357, RFC 4490, IDEA (International Data Encryption Algorithm), Mars, MISTY1, Rabbit, RC2, RC4, RC5, RC6, Rijndael, RSA, Seed, Skipjack, Sober, Seal, Twofish and the W7 algorithm.

The DNA or other secure marker or taggant such as an amino acid, a peptide, a protein, or a trace element marker can be affixed or coated onto the surface of an article or item to be marked or incorporated into the matrix of the physical tag which carries the taggant. This can be marking by surface marking, such as with an ink by inkjet ink, flexo ink, toner, epoxy ink, lithography, coating with a lacquer, plasma treatment and deposit of the marker onto the matrix, on the fibers of woven textiles, or by extrusion or injection molding of a material including marker DNA or other a nucleic acid or a protein-nucleic acid, an amino acid, a peptide, a protein, or a trace element marker incorporated into the matrix material to be injection molded. The DNA can include a security code. In one embodiment, this DNA can be paired with a security tool named digitalDNA™ that utilizes the flexibility of mobile communications, the instant accessibility of secure, cloud-based data, and the ease of barcode-based data capture further secured with unique DNA codes to make item tracking and authentication fast, easy and definitive.

In another embodiment, the DNA-secured encrypted code uses forensic authentication of a DNA marker, such as a botanical DNA marker, sequence-encrypted within a secure QR code, and physically included within the overt or covert ink used to print the code. The QR code may encode supplementary encrypted information or other data, such as the serial number of the item or object tagged, the manufacturer, the date, location, a link to a reference web-site or uniform resource locator (url) and any other desired data specific to the item or object carrying the QR code. The resulting QR code can be scanned by most mobile computers, bar code readers and smartphones installed with an application program capable of scanning and decoding the information in the pattern. Bar code readers are produced by a number of companies such as Motorola Solutions, Honeywell and others. Spectral analyzers are produced by Ocean Optics and JDS Uniphase among others. Combination ultraviolet/infrared reading units, primarily for analyzing cash or bank notes, are available from sites such as TradeKorea.com and alibaba.com. Thermal imagers are commercially available from companies such as Fluke and Flir and others. Mobile scans can be performed anywhere along the supply chain without limitation. The application software reads the digital taggant, which is the digital representative of the physical taggant, such as a DNA sequence, encoded in QR symbols. It may also track user profile information from the scanning session such as internet address, location, owner, time stamp and more. This method extends the technology beyond authentication and verification to digital chain of custody or track-and-trace for logistic and security purposes.

In one embodiment, the scan checks in wirelessly with a secure database in a "secure cloud" such as a "public or private cloud" accessible only to the customer using access codes and/or encryption, and displays the resulting analysis back on the mobile computer screen. Tracking information is fed into "tunable algorithms" that use pattern recognition to automatically identify supply-chain risks, for counterfeits or product diversion. Rapid-reading optical reporters associated with the DNA marker (such as for example covalently linked fluorophores) can also be embedded in the ink, and prevent the secure code from being digitally copied. The DNA markers included in such DNA-secured form of the encrypted codes facilitates forensic authentication where absolute proof of originality is required. Forensic authentication of the DNA in the tag, must match the sequences found in the decrypted DNA-secured form of the encrypted code. Applications such as cloud computing, mobile devices, and logistics are in need of the highest security available, including advanced encryption of data in transit and at rest. The DNA-secured encrypted codes can be used to track individually packaged items, such as drugs or luxury goods, when the space on the item is available to print the code matrix. On items too small for the matrix, such as microchips, the DNA-secured encrypted codes can be used on the packaging of individual items or lot shipments.

In another embodiment, the technology of the present invention avoids the risks of phishing scams to which non-secure QR codes are notoriously vulnerable, while other indicia such as geolocation and time-stamping throughout the supply chain provide further authenticity trails. Use of the ubiquitous iPhone® or Android® platforms allow the consumer to participate in the authentication scheme, quickly and easily. In addition, end-users can confirm freshness and expiration dates, connect to real-time or video technical support, identify local resources, easily place reorders, and participate in peer-to-peer selling.

In one embodiment of the invention a characteristic of a physical taggant, such as for instance, and without limitation, a critical sequence of a DNA molecule, such as a SigNature® DNA sequence is encrypted into a digital component. This digital content is then incorporated into a label. At the same time the physical taggant, such as SigNature® DNA can also be printed onto the label in an ink or via a carrier or by chemical attachment. The object carrying the label can then be instantly verified by comparing the encrypted digital information with information stored on a secure database. In addition, the full authentication can occur by reading the SigNature® DNA (e.g. by PCR amplification and sequence matching or hybridization) and comparison to the digital DNA information. A match is authentic, a non-match/absence is not authentic.

In another embodiment, the DNA-secured form of the encrypted code platform is designed to meet compliance specifications defined by the PCI (Payment Card Industry) Security Standards Council, the new and strict standards developed for handling credit card transactions. In another embodiment, DNA-secured form of the encrypted code platform of the invention meets the stringent requirements of HIPAA (Health Insurance Portability and Accountability Act), for protecting personal health information. In another embodiment, the DNA-secured form of the encrypted code platform is designed to meet compliance specifications of Loss Prevention Standard (LPS) 1224. In another embodiment, the DNA-secured form of the encrypted code platform is designed to meet compliance specifications of the U.S. Government FedRamp security controls. A related product, SigNature® DNA is a botanical DNA marker used to authenticate products in a unique manner that essentially cannot be copied, and provide a forensic chain of evidence that can be used in a court of law.

The DNA-secured encrypted code can be used by any commodity, bulk item or individual item supply business. Businesses that can benefit from the methods and systems of the present invention include local, national and multinational, businesses that may be involved in any kind of business with a supply chain, including for example, but not limited to electronics, machinery and components, such as ball bearings, arms and weaponry, connectors, vehicles and vehicle parts (e.g. panels, bodies, control modules, engines and wheels etc.), connectors, fasteners, packaging, food and nutritional supplements, pharmaceuticals, textiles, clothing, luxury goods and personal care products, as well as jewelry, art, collectibles and other valuables, stock certificates and currency notes to name just a few.

The present invention provides machine-readable markers with varying levels of information content, accuracy and security that can be used to identify physical objects and provide data associated with the object to which they are attached. Examples of useful markers that can be read through reflected incident light, emitted light or energy emissions include one dimensional and two dimensional bar codes, optical marker compounds, detectably marked DNA taggants, chemical dyes, digitized images of an item itself, or thermal or olfactory emissions from an object.

Over time, a given environment such as a retail store, warehouse, or logistics company may accumulate objects identified with various different types of markers and indicia and therefore will likely require multiple readers to extract all information required to conduct business processes. This type of environment requiring a broad line of readers for different markers and indicia is costly, inefficient and ineffective for the user desirous of handling information in a seamless, integrated way.

The present invention provides a method for accumulating and integrating the data encoded in a plurality of markers and indicia in a given environment to produce more rich and complex data content to enhance security and reading efficiency. One physical area can include a combination of the plurality of various different forms of markers and indicia that emit or reflect light signals, thermal properties, olfactory properties and other energy in unique or standard patterns for machine readability. Use of combinations of such markers in an integrated way, can produce denser more complex information, providing benefit to users in information security, streamlined user process training, and a reduced packaging landscape for marking, among other advantages.

Figure 1:
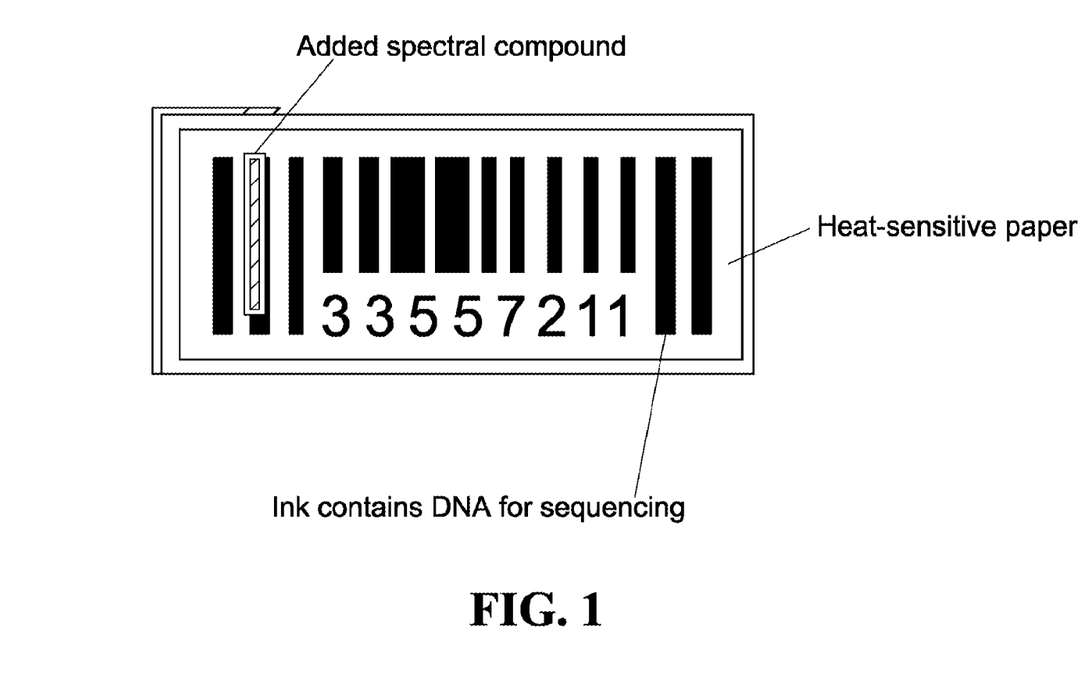
FIG. 1 shows a one dimensional bar code with an added spectral compound deposited over most of the second bar from the left. The added compound does not interfere with the reading of the bar code, and provides a spectral image for coding information relating to the object or item to which the bar code is attached. The second bar from the right includes a DNA marker in the ink. The DNA marker can be sequenced for additional encoded information and data.

Physical objects can be identified through machine-readable means by capturing, dissecting and measuring energy emissions from either their inherent spectral, thermal, radio frequency, olfactory, DNA or other compositional makeup or through indicia placed on them such as bar codes, inks, polymer compounds and more. The energy can be captured through optical or other analog means, digitized via electronics, and then processed through software to convert the data into a form readable and manipulable by host computers. There are many physical embodiments for these reader instruments with associated electronics such as a spectrometer, thermal analyzer, bar code reader, radio frequency identification (RFID) readers and the like and more. It is proposed that these markers and indicia be combined or integrated in such a way as to produce intelligence from their combined pattern. For example FIG. 1 shows a spectral compound applied to a predetermined area of a bar code or image. This approach may be used to not only assist in locating the compound marker which may be invisible to the human eye, but also to indicate specific information due to its position. For example, in FIG. 1 below, the spectral compound is located on the second bar of the bar code and could be used to represent a particular item of data, such as for instance, the 2nd month of the year. The device(s) reading the marker or indicia would be able to identify the addition of the compound by its spectral profile and therefore discount it in the processing of the bar code reflection signal. The complexity, and therefore security, of the marking could be increased by combining such other approaches, such as that shown in FIG. 1 using thermally-sensitive paper that produces a known profile when exposed to a known heat source; using thermally-sensitive ink or other compound in a visible or invisible pattern that produces a known profile when exposed to a known heat source; adding a compound to the object, label or ink with a known olfactory emission for human and/or machine detection. The reader instrument capable of determining and extracting data from this multiplicity of markers and indicia in a single device can be a portable or handheld reader instrument. Alternatively, more than one reader instrument can be used to each read one or more different markers or indicia and send the digitized information to a common computer system for further processing.

The present inventive concept also provides a method for reducing the number of reading devices and associated costs and complexities described above in an environment wherein items are uniquely identifiable with a variety of marker and indicia types. The invention leverages common circuitry and software code for the digital data processing, computing and communications capabilities of the various marker and reader instrument technologies emitting light signals, thermal profiles, olfactory emissions and other such emissions; as well as their hardware components such as housing, accessories, display and other associated elements. Fewer devices with more commonality provide benefits to users by simplifying inventory management of the devices and user training, and make support and repair processes more efficient, and generally improve business processes.

Bar code readers, image-capture devices, cameras, spectrometers, and other devices capture reflected or inherent light from a bar code, object or image; convert the input to an analog or digital signal; process the analog or digital signal through software which converts it to a form capable of manipulation by host computers. There are many physical embodiments for these electronics.

Certain chemicals, metals and other compounds or substances inherently emit light or other energy which can be captured and dissected into its component spectral or thermal characteristics by such instruments as a spectrometer, diffraction grating, crystal, thermal analysis instruments or other means. The captured signals are translated to a format that is digitized and used within downstream computing and data storage processes or printed out to be analyzed.

These spectral and energy reading device systems can be combined or integrated where similarities exist and interface to elements that remain separate. For example a system which accepts input from multiple types of optical and energy reading mechanisms which can be in a single unit device or tethered together from separate devices. Such single unit or separate devices can be linked to a computer system capable of recording the data exported from the device(s) onto storage media for further retrieval and analysis.

The multiple input reading mechanisms may remain separate, as each can be optimized to capture light or energy reflected from or emanating from different types of indicia or markers such as a bar code, chemical compound, or other detectable substrate. However, if ergonomic, electrical, and other similarity exists, the elements can be combined into one element. The energy captured from the various input mechanisms are sent to a common microprocessor (software/firmware/hardware) module for processing the analog signal into digital information that is captured, stored and further processed by one or more common host computing systems. This combination of two or more readers, each transmitting the energy signal to the same digital processing circuitry and beyond simplifies processing, eliminates the cost of requiring multiple devices and brings maximum efficiency to business process management.

In one embodiment, a single device contains an ultraviolet and an infrared light source to detect, analyze and report the identity of a marker using a material which reflects or emits known energy profiles in these wavelength bands upon exposure to or excitation by an energy source in these bands. The device reports the results to the user through audio and/or visual means.

Figure 2:
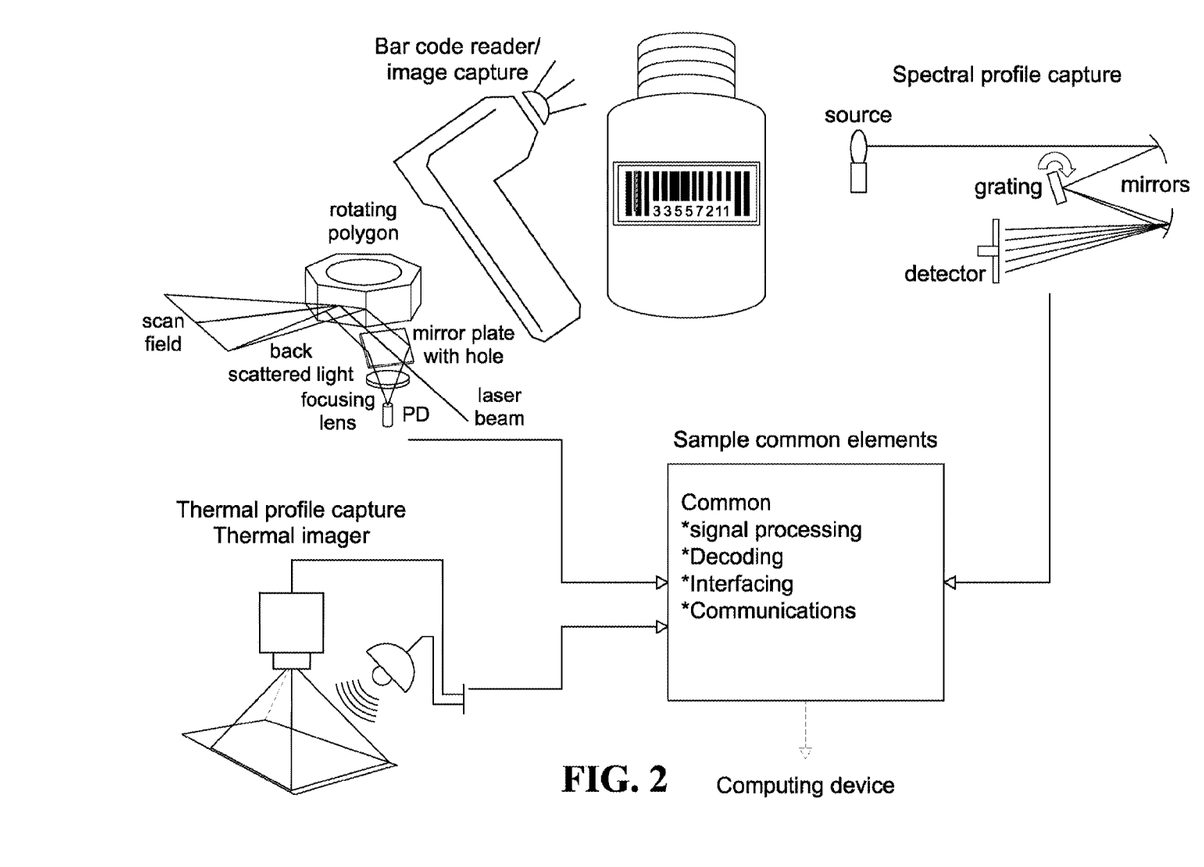
FIG. 2 shows three image capturing methods and devices: A bar code scanner, a spectral reader with a grating for monochromatic illumination; and a thermal profile imaging device. Each can be operatively connected to a computing device for comparison with a database.

FIG. 2 shows in concept three types of input reading mechanisms, each optimized for capturing light or other energy emanating from different types of markers. They may represent the types of analog light or energy capture commonly done as part of devices known as bar code laser scanners, cameras, CCD camera based readers, spectrometers, thermo-analyzers and others. These input reading mechanisms may be embodied in one continuous housing or operate as modules tethered to a common housing for follow-on processing. The energy is further processed from analog to digital form with some shared electronic and software components.

In one embodiment, the multi-mode reader instrument of the invention is capable of detecting data from a signal from two, three, four or more markers, indicia or taggants on an object. The markers, indicia or taggants may include a bar code, such as a one dimensional or a two dimensional bar code; a QR code, an RFID, an optical compound such as a dye or a pigment; a fluorescent compound, a luminescent compound, a phosphorescent compound, a DNA taggant, an upconverting phosphor (UCP), a chemical dye, a digitized image, a an alpha particle, a beta particle and a gamma wave emitted from a radioactive compound or a thermal emission from the object. The multi-mode reader instrument can be a multi-mode reader instrument capable of detecting and recording data from a light signal such as visible light, ultraviolet (UV) light or infrared light. Alternatively, the multi-mode reader instrument can be a multi-mode reader instrument capable of detecting and recording data from a radio signal such as the signal from an RFID tag. In one embodiment the multi-mode reader instrument can emit a signal that is received by the RFID tag and the RFID tag then may emit a radio frequency signal that can be detected by the multi-mode reader instrument.

In another embodiment, the invention provides a method of accessing data from an object, the method includes: obtaining data from a multi-mode reader instrument reading signals from one or more markers, indicia or taggants on an object, the markers, indicia or taggants being selected from a bar code, a QR code, an RFID, an optical compound, a fluorescent compound, a phosphorescent compound, a DNA taggant, an upconverting phosphor (UCP), a chemical dye, a digitized image, a radioactive compound and a thermal emission from the object. The DNA taggant can include labeled DNA, such as for instance and without limitation a fluorescently labeled DNA. The multi-mode reader instrument can be used at DNA marking facilities for quality control and at approved entities within the supply chain such as distributors and prime contractors for quick detection of DNA marks at various handling points such as receiving, warehousing and field inspection. Verification of DNA sequences can be at a approved DNA analysis facility (e.g. at Applied DNA Sciences, Inc., Stony Brook, N.Y.).

One example of the efficiencies of the multi-mode reader instrument is shown in an embodiment wherein all input signals are collected and processed for noise using the same electronics and software where possible, and are then converted to a digital code library based on two indices: one representing its position on the energy spectrum, and one representing its relative intensity level.

Figure 3:
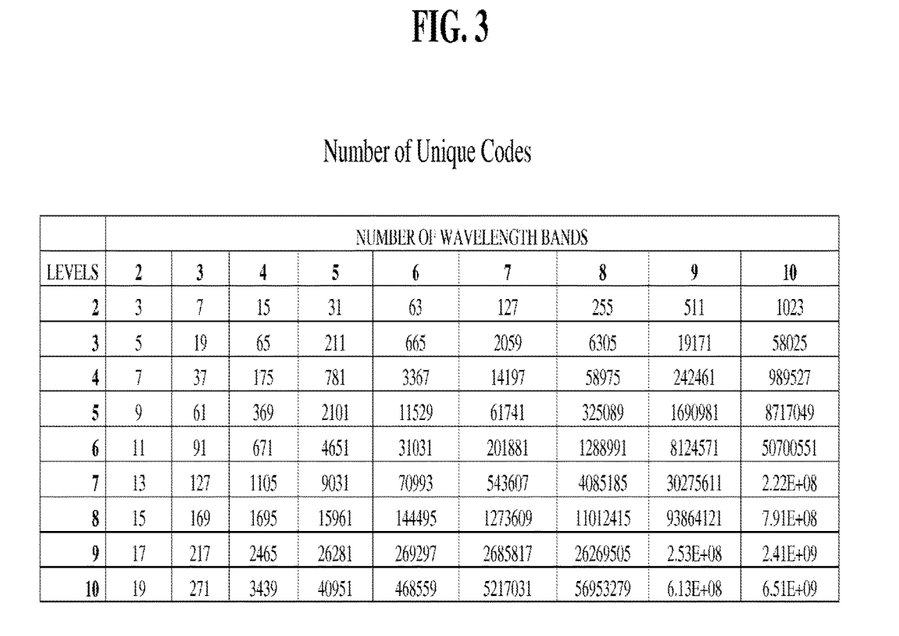
FIG. 3 is a table showing the number of unique codes determinable with 1-10 color levels (amplitudes) and 2-10 wavebands or channels according to formula I, below.

FIG. 3 shows the increase in unique coding capacity as a function of number of wavebands (corresponding to the number of filters) and number of intensity levels discriminated. The number of unique codes is derived by formula I:

$$K = (N\_levels)^{N\_colors} - (N\_levels - 1)^{N\_colors} \qquad (I)$$

wherein N_colors is the number of colors or wavebands and N_levels is the number of intensity or amplitude levels Thus, an instrument having detectors in nine wavebands and capable of discriminating four different intensity levels can distinguish between 242,461 unique codes. That is, a counterfeiter has less than one chance in two hundred and forty thousand of duplicating the authentic code. (See FIG. 3). This arrangement allows for a huge number of data points to be encoded in a single image or spectrum.

In one embodiment, one of the wavebands is allocated to a reference marker, this reference marker may be in a waveband having a maximum intensity level or amplitude. The remaining wavebands may be normalized to the reference marker intensity level or amplitude. One embodiment of the electronics and software required to collect and process the signals emitted from objects is to use an array of charged-couple-device imagers preceded by energy band-pass filters selected to match the field of view, the resolution and the target energy range for a given environment in which the device will be used. In another embodiment of the device a transmission grating or a filter wheel precedes the imager for the collection of varying energy views. For highest resolution, an embodiment of the device can be made with a spectrometer based design without bandpass or any other filtering method.

In another embodiment, the invention provides a system for identifying an object, the system includes: a multi-mode reader instrument capable of detecting data from a signal from one or more markers, indicia or taggants on an object, the markers, indicia or taggants being selected from a microdot, a bar code, a QR code, an RFID, an optical compound, a fluorescent compound, a phosphorescent compound, a DNA taggant, an upconverting phosphor (UCP), a chemical dye, a digitized image, a radioactive compound, an olfactory compound and a thermal emission from the object; operatively connected to a database for storing the data from the multi-mode reader instrument. The database can be maintained on a computer-readable medium accessible by a computer for searching and comparison purposes in order to identify the markers, indicia or taggants on the object and thereby to validate the object.

The multi-mode reader instrument of markers and indicia of the present invention can be usefully employed by those business entities within the full supply chain of military electronic components and expanded to additional Federal Supply Group offerings, including Original Component Manufacturers, Original Equipment Manufacturers, Authorized and Independent Distributors and Prime Contractors. Other customers include those business entities within the full supply chain of commercial goods prone to counterfeiting, diversion and other brand challenges. These include but are not limited to pharmaceuticals, cosmetics, cash and valuables, identification documentation and textiles. This device can be used at final production quality control and by customers requiring detection of marks in the field. Scenarios determined for use are quality control laboratories at electronics marking and commercial facilities of distributors and original manufacturers; receiving docks of companies who have purchased electronic components and commercial goods to ensure authenticity or provenance prior to accepting goods; customs and border patrol; field based applications whether in warehouses, operational facilities or retail locations.

The unique marker compounds to be read by the multimode reader instrument of the invention, may be deposited in place on the item to be marked by any suitable method. For instance, pad printing, inkjet printing, laser printing, thermal transfer printing, flexographic printing and many commercial production methods may provide cost-effective placement of the unique markers onto components for identification. Pad printing and inkjet printing can be used with a proprietary DNA ink, such as for instance, SigNature DNA ink from Applied DNA Sciences Inc. Representative methods are described below:

Laser printing: Laser printing or laser marking generates a plasma and provides a surface chemistry suitable for promoting the adhesion or bonding of marker DNA molecules onto the surface of the item or object to be marked. Laser printing, also known as laser engraving, uses a coherent beam of photons to chemically and physically modify the surface for marking, producing visible marks created by novel microscopic structures that include localized catalytic surfaces for binding the marker molecules, such as the proprietary SigNature® DNA molecules. Furthermore, the proprietary DNA can be implanted on the laser marked areas. A laser can also be used to transfer the DNA molecules from a film such as by laser-induced forward transfer, LIFT. Compatible processes can be developed for attaching DNA onto marked components in currently operative laser marking process. For each brand of machine it is necessary to specify: energy, wavelength, printing speed and conveyor speed according to machine specifications; and to develop suitable methods to form the desired patterns on the surface to be marked.

Pad printing: Pad printers use an elastomeric pad to transfer an outline containing ink from a template onto a substrate. These printers use a specially formulated elastic polymer pad designed to have optimal surface properties for transferring and releasing inks onto the substrate surfaces. The pads must also have defined durometer properties that allow the inks to flow properly during printing. Likewise, for maximal adhesion and proper wetting of the surfaces, inks are formulated with adhesion promoter molecules and should be allowed sufficient time to realign on the inks surface during the transferring from the template to the target surface. DNA inks are introduced into existing ink for specific applications according to the particular application. For each brand of machine and ink type, it is necessary to specify the viscosity of the ink and the pad durometer; and to determine machine specifications: wait time, marking pressure, speed.

Inkjet printing: Inkjet printing or inkjet marking may include techniques such as thermal vaporization, vibration in conjunction with electric charges and an electric field to discharge ink droplets onto substrate surfaces to form images or patterns including marker molecules such as DNA molecules. The inks designed for inkjets have different chemical properties than inks used for other printing methods. Due to differences in inkjet printer machine designs, inks must be compatible with each type of machine. Inks used by different manufacturers require different chemical formulations for dispersing ink into defined volumes and sustaining sufficient amount of charge for use with a particular printer. The design of the print head can be optimized to produce unique marking patterns for security printing. For each brand of machine and ink type it is advisable to specify: ink viscosity; conveyor speed; pressure; and the high voltage required.

Curing: For the commercial market, inks cured by air drying are sufficient. However for the military application, strong polymer inks require either thermal or radiation for optimal curing by crosslinking. Thermal ink curing period is long, the order of many minutes at elevated temperature. Radiation curing using UV system is short, on the order of seconds at lower temperature than thermal curing. For energy saving and improving productivity, UV curing using different bulbs can be employed.

Figure 4:
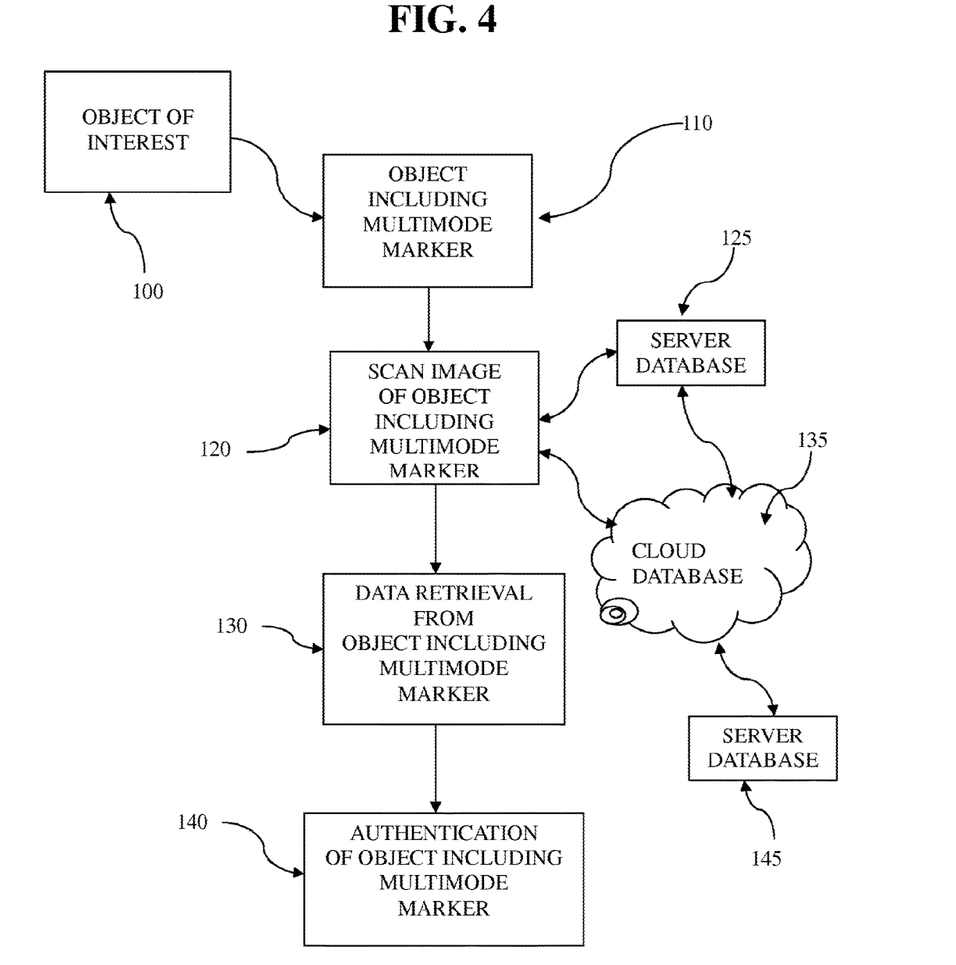
FIG. 4 is a flow chart showing the process of marking an object of interest and reading the markers with a multimode reader instrument, comparing the imaging data with data in a database on board the reader, in a database on a server or in the cloud connected to another server.

In FIG. 4 an object of interest 100 is marked with a combination of markers (a multimode marker) including one or more taggants independently selected from a microdot, a bar code, a QR code, an RFID tag, an optical compound, a fluorescent compound, a phosphorescent compound, a DNA taggant, an upconverting phosphor (UCP), a chemical dye, a digitized image, a radioactive compound, an olfactory compound and a thermal attribute of the object. The taggants can encode information related to the object, such as serial number, model type, composition, origin, history, manufacturing time and location data etc. The object including the multimode marker 110 can be passed into the stream of commerce and scanned with a multimode reader instrument at any point in transit or at the final destination at step 120. The image and/or spectral data obtained by the multimode reader instrument are digitized and may be stored locally in the instrument for retrieval at any time.

Alternatively, or in addition, the data may be transmitted to a secure server 125 encoding a database of information including the encoded information in the taggants on the object. The data transmitted from the multimode reader instrument is compared with the stored data and if it matches, a signal validating the data may be transmitted back to the multimode reader instrument, optionally with additional data related to the object that was stored in the database. In one embodiment, the multimode reader instrument transmits the data to a local computer (such as a PC, laptop, or file server) which is connected to a cloud server via wired or wireless internet communications. The local computer acts as a "buffer" to store data captured by the multimode reader and communicate at a later time to the cloud server; this architecture enables local operations such as a production line to continue without interruption should any communications with the cloud server be interrupted or intermittent.

In a second alternative, or in addition, the data may be transmitted to a cloud server 135 encoding a database of information including the encoded information in the taggants on the object. The data transmitted from the multimode reader instrument is compared with the stored data in the cloud database and if it matches, a signal validating the data may be transmitted back to the multimode reader instrument, optionally with additional data related to the object that was stored in the cloud database. Optionally, the cloud database may transmit the data to another secure server 145 that may store the received data related to the object of interest or transmit further data related to the object of interest to the cloud server 135 and optionally the cloud server may transmit the further data related to the object of interest to the multimode reader instrument for local storage and retrieval by authorized users in step 130.

Having retrieved data related to the object of interest and thus preliminarily validated the object, the final authentication and validation step 140 can be performed by providing a sample of the taggant for testing for a unique DNA marker by standard laboratory methods of amplification (by any suitable method, such as PCR or isothermal amplification), sequence specific hybridization or DNA sequencing as are well known in the art. Successful amplifying the taggant DNA from the sample with the matching primer pairs and/or hybridizing the amplicons with a specific hybridization probe, or matching the DNA sequence with the unique taggant marker DNA sequence provides the final gold-standard authentication of the object of interest.

Example 1: Prototype Handheld Multimode Spectral and Image Reader Instrument

A prototype instrument included an LED UV bulb emitting at 375 nm and nine CCD cameras each with a different wavelength band filter of approximately 20-40 nm bandwidth and centered at 425 nm, 440 nm, 475 nm, 530 nm 581 nm, 615 nm, 640 nm, 680 nm and 708 nm. The cameras were arranged to have the same field of view of a 20×20 mm area. The image can be of any marker, such as a logo, a trademark, a symbol, a miniature image, or even of an image invisible to the naked eye, located by the signal revealed by the instrument. High resolution images were digitized and uploaded to a PC through a USB port. Images were acquired simultaneously in exposures from less than 100 ms to 2 seconds. Images in pseudocolors (electronically transmuted into the visible range easily discriminated by the human eye) were displayed on a PC monitor and could be used to adjust the target area to center the image and maximize the signal. Spectral images were captured from spot taggants and from text images of alphanumeric characters formed with multimode marked ink as a taggant. Fluorescence and phosphorescence signals can be imaged and recorded after illumination is shut off.

A scaling function was used to normalize the spectrum to the candidate library value. This results in lower noise than a simple division by the maximum amplitude value. Matlab was used to normalize the amplitudes of the spectral images. The highest amplitude spectrum was used as a reference signal to normalize the signals from the other waveband channels. The determined amplitudes from the marker channels were then compared with a library of reference marker signals to identify the multimode marker imaged by the handheld multimode spectral and image reader instrument. Matches identified the marker as corresponding to the library marker, which was linked to a particular dataset for authentication and validation of the object.

Example 2: Another Handheld Multimode Spectral and Image Reader Instrument

This prototype handheld multimode spectral and image reader instrument includes a visible light bulb, an LED UV bulb and nine CCD cameras each with a different wavelength band filter of approximately 20-40 nm bandwidth in any suitable band, such as centered at 425 nm, 450 nm, 475 nm, 525 nm 575 nm, 600 nm, 635 nm, 670 nm and 700 nm. The cameras are arranged to have the same field of view of about 20×20 mm. The image can be of any visible marker, such as a logo, a trademark, a symbol, a miniature image, or even of an image invisible to the naked eye, located by the signal revealed by the instrument. High resolution images are digitized stored locally within the instrument and can be uploaded to a PC. Images are acquired simultaneously in exposures from less than 10 ms to 20 seconds. Images in pseudocolors (i.e., electronically transmuted into the visible range easily discriminated by the human eye,) are displayed on a PC monitor and can be used to adjust the target area to center the image and maximize the signal. Spectral images are captured from spot taggants and from text images of alphanumeric characters are formed with multimode marked ink as a taggant. Fluorescence and phosphorescence signals are similarly imaged and recorded after illumination is shut off.

A scaling function is used to normalize the spectrum to the candidate library value. An onboard program is used to normalize the amplitudes of the spectral images to reduce signal noise. The highest amplitude spectrum is used as a reference signal to normalize the signals from the other waveband channels. The amplitudes are determined from the marker channels and are then compared with a library of reference marker signals to identify the multimode marker imaged by the handheld multimode spectral and image reader instrument. Matches identify the marker as corresponding to a particular library marker, which is linked to a dataset for authentication, validation and tracking of the object interrogated by the reader.

The description and examples provided herein are for illustration purposes only and are not intended to be taken as limiting the scope of the invention. The patents, patent applications and other references cited herein are incorporated by reference in their entireties. If a term defined herein is in conflict with its definition as used in one or more references or patents incorporated herein, the meaning provided in this specification is intended.

The invention claimed is:

1. A system associated with authentication of an object related to a multi-mode marker using a processing device:
   the processing device performing operations that include:
   detecting a signal associated with a multi-mode marker related with the object;
   assigning a digital code based on the detected signal associated with the multi-mode marker; and
   identifying the object based on the digital code related to authentication of the object.

2. The system of claim 1, wherein the multi-mode marker includes at least one of: a molecule, an olfactory compound, a thermal attribute, a thermal emission, an optical compound, a fluorescent compound, a microdot, a digitized code, a QR code, a bar code, a radio-frequency identification (RFID) tag, a DNA molecule, a DNA sequence, a DNA marking, an upconverting phosphor (UCP), a chemical dye, a digitized image of at least a portion of the object, an electromagnetic emission, a radioactive compound, a fluorophore, an optical reporter, a phosphorescent compound, a spectral characteristic, an optical signature, a colored compound, ultraviolet absorbing compound, an infrared absorbing compound, and a phosphor.

3. The system of claim 1, wherein the multi-mode marker comprises at least one taggant.

4. The system of claim 3, wherein the at least one taggant comprises an encrypted identifier associated with authentication information of the object.

5. The system according to claim 1, wherein signals from one or more multi-mode markers related with the object, are captured simultaneously as images from a plurality of sensors.

6. The system according to claim 1, wherein one of multiple signals is detected and is considered a reference signal and another of the multiple signals is considered an informational signal.

7. The system according to claim 6, wherein the informational signal is calibrated by comparison with the reference signal.

8. The system according to claim 1, further comprising a sensor for detecting the position of a taggant locator that identifies a position of at least one taggant related with the object.

9. The system according to claim 8, wherein the taggant locator is detected as a signal selected from the group consisting of a visible signal, a fluorescent signal, a radioactive signal, a phosphorescent signal and a thermal attribute.

10. The system according to claim 8, wherein the taggant locator is selected from the group consisting of a logo, a trademark, a bar code, a scratch-off code and an RFID tag.

11. The system according to claim 1, the processing device capable of recording data from the signals detected from the one or more taggants on the object.

12. The system according to claim 11, wherein the data determined from the one or more taggants on the object is stored in a memory device or communicated to a server for comparison with stored data.

13. The system according to claim 11, further comprising a display for viewing a taggant locator, or at least one of the signals detected from the one or more taggants on the object.

14. The system according to claim 1, wherein each sensor further comprises one or more optional filters for limiting the signal detected by each sensor, the one or more filters limiting the signals detected to a different range of wavelengths.

15. The system according to claim 14, wherein one or more of the plurality of the sensors each have a filter for limiting the signal detected by the sensor, wherein the at least two of the filters limit the signal detected by the sensor to different wavelength ranges.

16. The system according to claim 15, wherein the filters each limit the signal wavelength to a bandwidth within a wavelength range that is: about 5 nm to about 75 nm; about 10 nm to about 50 nm; or about 250 nm to about 1,000 nm.

17. A method associated with authentication of an object related to a multi-mode marker using a processing device: the processing device performing operations that include:
 detecting a signal associated with a multi-mode marker related with the object;
 assigning a digital code based on the detected signal associated with the multi-mode marker; and
 identifying the object based on the digital code related to authentication of the object.

18. The method of claim 17, wherein the multi-mode marker includes at least one of: a molecule, an olfactory compound, a thermal attribute, a thermal emission, an optical compound, a fluorescent compound, a microdot, a digitized code, a QR code, a bar code, a radio-frequency identification (RFID) tag, a DNA molecule, a DNA sequence, a DNA marking, an upconverting phosphor (UCP), a chemical dye, a digitized image of at least a portion of the object, an electromagnetic emission, a radioactive compound, a fluorophore, an optical reporter, a phosphorescent compound, a spectral characteristic, an optical signature, a colored compound, ultraviolet absorbing compound, an infrared absorbing compound, and a phosphor.

19. A computer-readable device storing instructions associated with authentication of an object related to a multi-mode marker, the instructions being executable by a processing device:
 the instructions causing the processing device to perform operations upon execution, that include:
  detecting a signal associated with a multi-mode marker related with the object;
  assigning a digital code based on the detected signal associated with the multi-mode marker; and
  identifying the object based on the digital code related to authentication of the object.

20. The computer-readable device of claim 19, wherein the multi-mode marker includes at least one of: a molecule, an olfactory compound, a thermal attribute, a thermal emission, an optical compound, a fluorescent compound, a microdot, a digitized code, a QR code, a bar code, a radio-frequency identification (RFID) tag, a DNA molecule, a DNA sequence, a DNA marking, an upconverting phosphor (UCP), a chemical dye, a digitized image of at least a portion of the object, an electromagnetic emission, a radioactive compound, a fluorophore, an optical reporter, a phosphorescent compound, a spectral characteristic, an optical signature, a colored compound, ultraviolet absorbing compound, an infrared absorbing compound, and a phosphor.

* * * * *